United States Patent
Ishiwatari et al.

(10) Patent No.: US 10,647,315 B2
(45) Date of Patent: May 12, 2020

(54) ACCIDENT PROBABILITY CALCULATOR, ACCIDENT PROBABILITY CALCULATION METHOD, AND NON-TRANSITORY COMPUTER-READABLE MEDIUM STORING ACCIDENT PROBABILITY CALCULATION PROGRAM

(71) Applicant: Mitsubishi Electric Corporation, Tokyo (JP)

(72) Inventors: Yosuke Ishiwatari, Tokyo (JP); Takehiko Hanada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 15/781,786

(22) PCT Filed: Jan. 28, 2016

(86) PCT No.: PCT/JP2016/052437
§ 371 (c)(1),
(2) Date: Jun. 6, 2018

(87) PCT Pub. No.: WO2017/130342
PCT Pub. Date: Aug. 3, 2017

(65) Prior Publication Data
US 2018/0362037 A1    Dec. 20, 2018

(51) Int. Cl.
*B60W 30/095* (2012.01)
*G08G 1/16* (2006.01)
(Continued)

(52) U.S. Cl.
CPC ..... *B60W 30/0956* (2013.01); *G06K 9/00805* (2013.01); *G08G 1/0962* (2013.01);
(Continued)

(58) Field of Classification Search
CPC .......... B60W 30/0956; B60W 2250/10; G06K 9/00805; G08G 1/167; G08G 1/166; G08G 1/0962
See application file for complete search history.

(56) References Cited

U.S. PATENT DOCUMENTS

| 6,014,608 A * | 1/2000 | Seo ..................... G01C 21/3602 701/468 |
| 2006/0186702 A1* | 8/2006 | Kisanuki ................. B60R 21/36 296/187.04 |

(Continued)

FOREIGN PATENT DOCUMENTS

| JP | 2007-099237 A | 4/2007 |
| JP | 2007-257338 A | 10/2007 |

(Continued)

OTHER PUBLICATIONS

International Search Report for PCT/JP2016/052437 dated Apr. 5, 2016 [PCT/ISA/210].

*Primary Examiner* — Russell Frejd
(74) *Attorney, Agent, or Firm* — Sughrue Mion, PLLC; Richard C. Turner

(57) ABSTRACT

A blind spot identification unit (21) identifies a plurality of obstacles causing a blind spot in an area around a vehicle. An individual calculation part (231) calculates, as an individual probability, a probability of occurrence of a traffic accident at a target position with respect to the position of a target object which is each of the obstacles identified by the blind spot identification unit (21). A combined calculation part (232) calculates, as a combined probability, a probability of occurrence of a traffic accident at the target position with respect to each of the plurality of obstacles from the individual probability calculated by the individual calculation part (231).

9 Claims, 17 Drawing Sheets

(51) Int. Cl.
    *G08G 1/0962* (2006.01)
    *G06K 9/00* (2006.01)
(52) U.S. Cl.
    CPC ............ *G08G 1/166* (2013.01); *G08G 1/167* (2013.01); *B60W 2550/10* (2013.01)

(56) References Cited

U.S. PATENT DOCUMENTS

| | | | |
|---|---|---|---|
| 2008/0097699 A1* | 4/2008 | Ono | B60R 21/0134 701/300 |
| 2015/0142285 A1 | 5/2015 | Nagata et al. | |
| 2016/0358081 A1* | 12/2016 | Cama | G06F 16/29 |
| 2017/0372431 A1* | 12/2017 | Perl | G06Q 20/10 |
| 2018/0118144 A1* | 5/2018 | Yoshihira | B60R 21/0132 |

FOREIGN PATENT DOCUMENTS

| | | |
|---|---|---|
| JP | 4604683 B2 | 1/2011 |
| JP | 2012-089084 A | 5/2012 |
| JP | 2014-002460 A | 1/2014 |
| JP | 2014-203349 A | 10/2014 |
| JP | 5703682 B2 | 4/2015 |

* cited by examiner

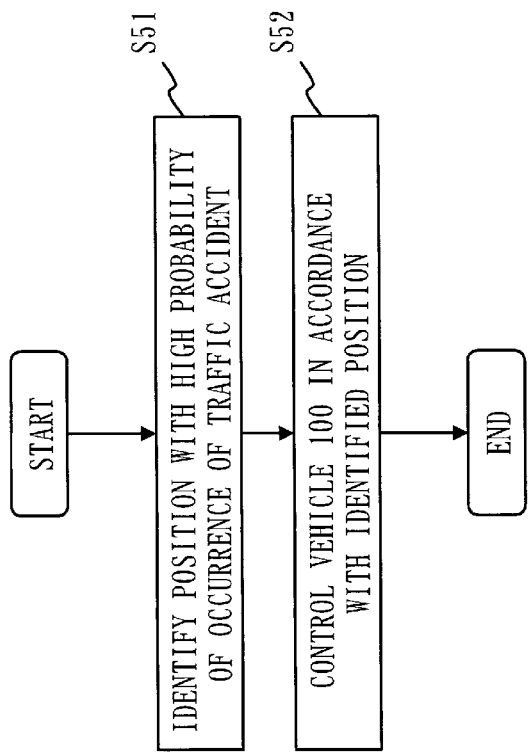

ACCIDENT PROBABILITY CALCULATOR, ACCIDENT PROBABILITY CALCULATION METHOD, AND NON-TRANSITORY COMPUTER-READABLE MEDIUM STORING ACCIDENT PROBABILITY CALCULATION PROGRAM

CROSS REFERENCE TO RELATED APPLICATIONS

This application is a National Stage of International Application No. PCT/JP2016/052437 filed Jan 28, 2016.

TECHNICAL FIELD

The present invention relates to a technique for calculating a probability of occurrence of a traffic accident with an object popping out of a blind spot of an obstacle around a vehicle.

BACKGROUND ART

There has been developed an autonomous driving technology which recognizes an obstacle around a vehicle using a sensor mounted on the vehicle and drives the vehicle while avoiding the obstacle. An obstacle recognized early on by the sensor can be avoided by controlling the vehicle from a distant location. However, objects such as a person and a vehicle may suddenly pop out from a blind spot that cannot be recognized by the sensor. It may be difficult to avoid the objects popping out because the distance thereto is short at the time it is recognized by the sensor.

Patent Literature 1 describes determining whether an object pops out from a blind spot by using information such as the position, size, and shape of something that causes the blind spot.

CITATION LIST

Patent Literature

Patent Literature 1: JP 2012-089084 A

SUMMARY OF INVENTION

Technical Problem

There remains a danger regardless of the position, size, and shape of something causing the blind spot because an object can pop out even if it is not seen from the vehicle. What is important around the blind spot is to avoid an object popping out.

If one knows around where an object pops out from the blind spot, the vehicle can avoid a collision with the object popping out by taking action such as traveling while avoiding the position where the object pops out. In other words, if one can know at which position around the blind spot a traffic accident is likely to occur, a collision with the object popping out is more likely to be avoided.

An object of the present invention is to identify at which position a traffic accident is likely to occur with an object that pops out from a blind spot of an obstacle around a vehicle.

Solution to Problem

An accident probability calculator according to the present invention includes:

a blind spot identification unit to identify an obstacle around a vehicle; and an individual calculation part to calculate, as an individual probability, a probability of occurrence of a traffic accident at a target position with respect to a position of a target object which is the obstacle identified by the blind spot identification unit.

Advantageous Effects of Invention

The present invention calculates the probability of occurrence of an accident at the target position in view of the obstacle around the vehicle. As a result, one can identify at which position around a blind spot a traffic accident is likely to occur.

BRIEF DESCRIPTION OF DRAWINGS

FIG. 17 is a flowchart of drive control processing according to the fifth embodiment.

DESCRIPTION OF EMBODIMENTS

Figure 1:
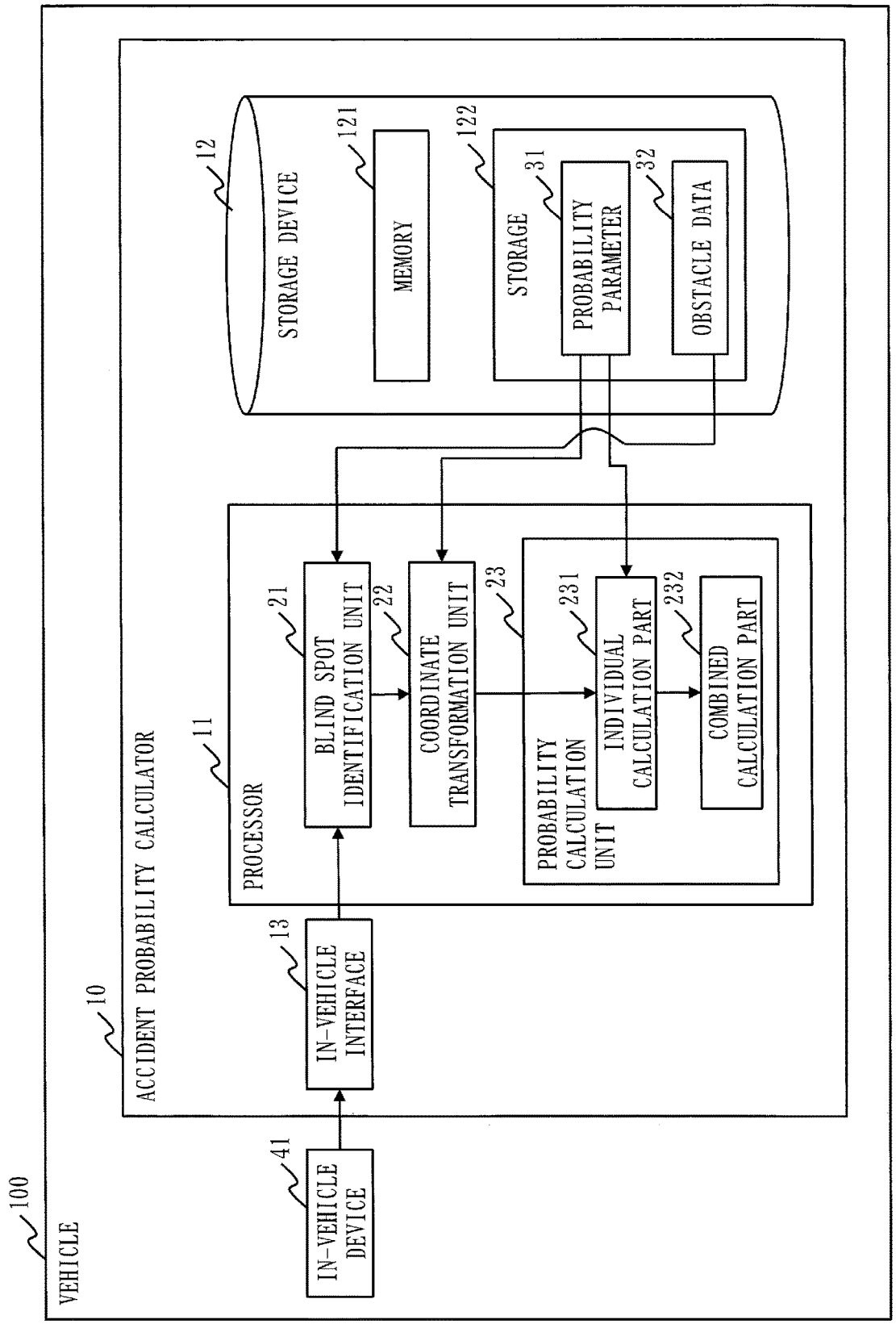
FIG. 1 is a block diagram of an accident probability calculator 10 according to a first embodiment.

First Embodiment
Description of Configuration
The configuration of an accident probability calculator 10 according to a first embodiment will be described with reference to FIG. 1.
The accident probability calculator 10 is a computer mounted on a vehicle 100. The accident probability calculator 10 is the computer that uses a probability parameter 31, with which a probability of occurrence of a traffic accident can be calculated for each relative position with respect to an obstacle, and calculates the probability of occurrence of a traffic accident at each position in view of one or more of the obstacles around the vehicle 100 identified by obstacle data 32.

The accident probability calculator 10 includes a processor 11, a storage device 12, and an in-vehicle interface 13. The processor 11 is connected to other hardware via a signal line to control the other hardware.

The processor 11 is an integrated circuit (IC) that performs processing. The processor 11 is specifically a central processing unit (CPU), a digital signal processor (DSP), or a graphics processing unit (GPU).

The storage device 12 includes a memory 121 and a storage 122. The memory 121 is specifically a random access memory (RAM). The storage 122 is specifically a hard disk drive (HDD). Alternatively, the storage 122 may be a portable storage medium such as a Secure Digital (SD) memory card, a CompactFlash (CF), a NAND flash, a flexible disk, an optical disk, a compact disk, a Blu-ray (registered trademark) disk, or a DVD.

The in-vehicle interface 13 is a device to which an in-vehicle device 41 is connected, the in-vehicle device including a Global Positioning System (GPS) receiver, a gyro sensor, a camera, a laser sensor, a millimeter wave sensor, a speed sensor, and an acceleration sensor that are mounted on the vehicle 100.

The accident probability calculator 10 includes a blind spot identification unit 21, a coordinate transformation unit 22, and a probability calculation unit 23 as functional components. The probability calculation unit 23 includes an individual calculation part 231 and a combined calculation part 232. The function of each of the blind spot identification unit 21, the coordinate transformation unit 22, the probability calculation unit 23, the individual calculation part 231, and the combined calculation part 232 is implemented in software.

The storage 122 in the storage device 12 stores a program for implementing the function of each unit of the accident probability calculator 10. This program is loaded into the memory 121 by the processor 11 to be executed by the processor 11. As a result, the function of each unit of the accident probability calculator 10 is implemented.

Information, data, a signal value, and a variable value indicating a result of functional processing of each unit implemented by the processor 11 are stored in the memory 121 or a register or cache memory within the processor 11. The following description assumes that the memory 121 stores the information, the data, the signal value, and the variable value indicating the result of the functional processing of each unit implemented by the processor 11.

It is assumed above that the program executed by the processor 11 to implement each function is stored in the storage device 12. However, the program may be stored in a portable storage medium such as a magnetic disk, a flexible disk, an optical disk, a compact disk, a Blu-ray (registered trademark) disk, or a DVD.

FIG. 1 illustrates only one processor 11. However, a plurality of the processors 11 may be included to cooperatively execute the program implementing each function.

Description of Operation

The operation of the accident probability calculator 10 according to the first embodiment will be described with reference to FIGS. 2 to 7.

The operation of the accident probability calculator 10 according to the first embodiment corresponds to an accident probability calculation method according to the first embodiment. The operation of the accident probability calculator 10 according to the first embodiment further corresponds to processing of an accident probability calculation program according to the first embodiment.

The operation of the accident probability calculator 10 according to the first embodiment includes parameter transformation processing and probability calculation processing.

Figure 2:
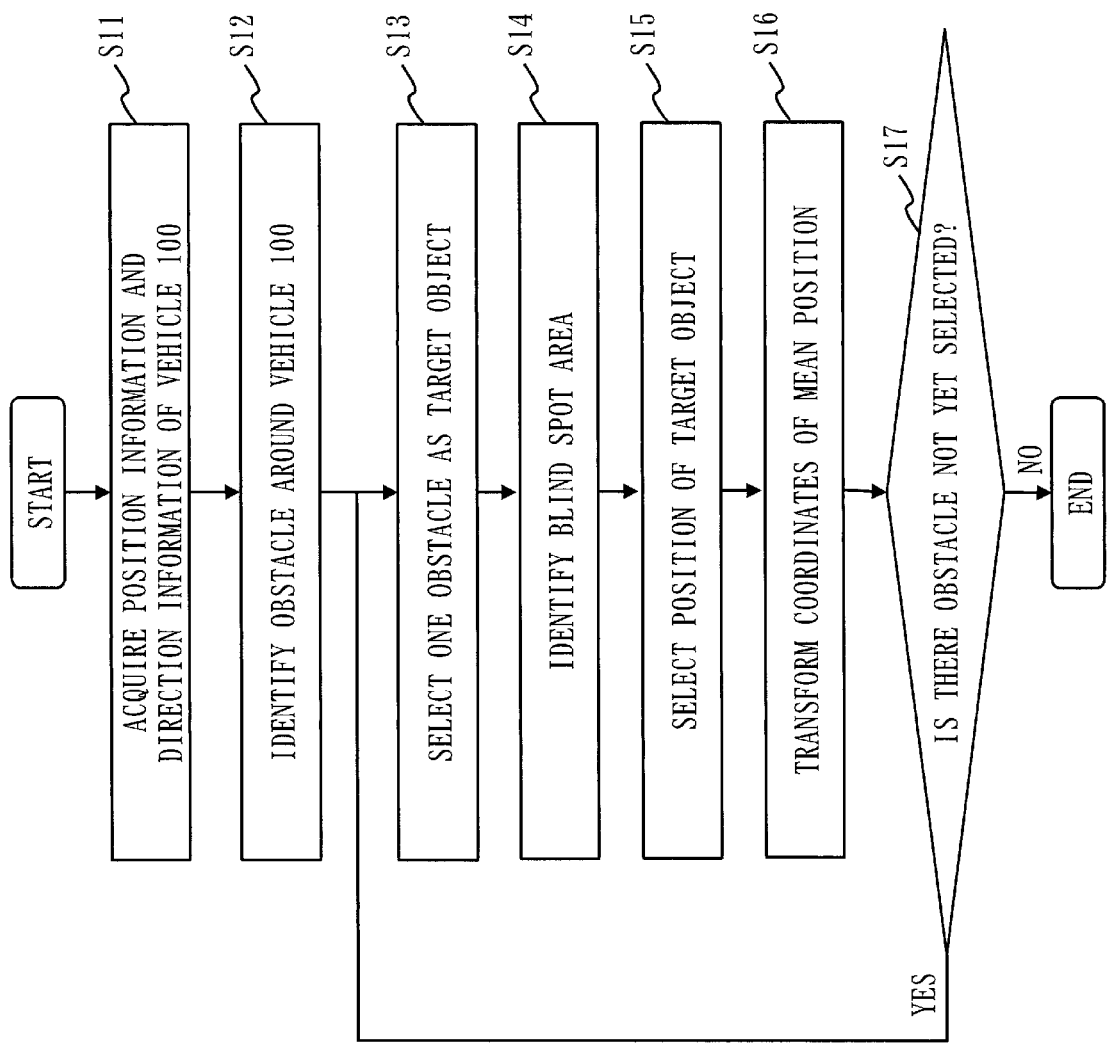
FIG. 2 is a flowchart of parameter transformation processing according to the first embodiment.

The parameter transformation processing according to the first embodiment will be described with reference to FIG. 2.

The parameter transformation processing assumes that the probability parameter 31 and the obstacle data 32 are stored in the storage 122.

Figure 3:
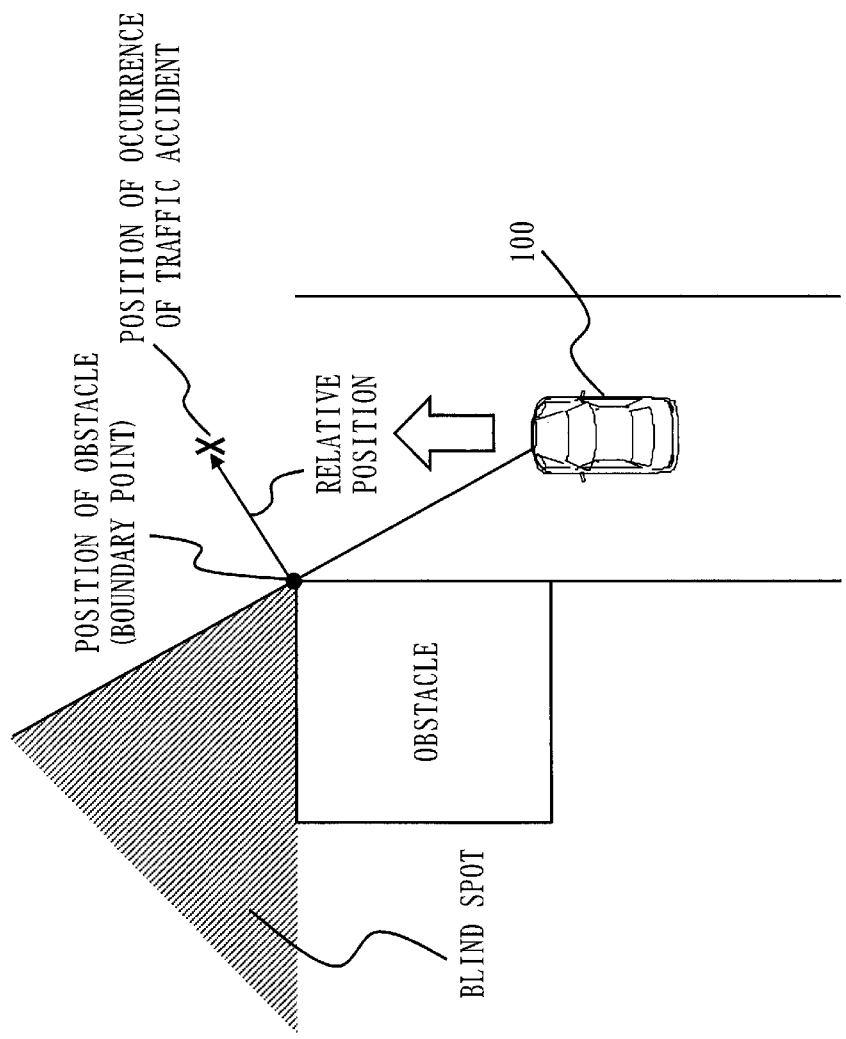
FIG. 3 is an illustrative diagram of a probability parameter 31 according to the first embodiment.

The probability parameter 31 is information with which a probability of occurrence of a traffic accident can be calculated at each relative position with respect to an obstacle. In the first embodiment, the probability parameter 31 indicates a mean position which is a mean of the relative positions at which a traffic accident occurs with respect to the position of the obstacle, and a variation in the relative positions. In the first embodiment, the probability parameter 31 expresses the variation as a standard deviation. As illustrated in FIG. 3, the relative position indicates a relative position at which a traffic accident occurs when the position of a boundary point of the obstacle causing a blind spot is regarded as the position of the obstacle, and indicates the distance and direction from the position of the obstacle. The direction is a relative direction with respect to the direction of travel of the vehicle 100.

The obstacle data 32 is data on the obstacle causing the blind spot. The obstacle data 32 indicates the position of the obstacle and an occupied area which is the area of the obstacle in a two-dimensional plane. The first embodiment assumes the occupied area to be a polygon. Note that the occupied area is herein described as a rectangle.

The parameter transformation processing further assumes that a position for which the probability of occurrence of a traffic accident is calculated is specified as a target position. It is assumed that the target position is represented by coordinates in a coordinate system with its origin at the position of the vehicle 100.

The following description assumes that only one position is specified as the target position. However, a plurality of the target positions may be specified. When the plurality of the target positions is specified, the parameter transformation processing and the probability calculation processing are repeated for all the target positions being specified.

In step S11, the blind spot identification unit 21 acquires position information indicating the position of the vehicle 100 and direction information indicating the direction of travel of the vehicle from the in-vehicle device 41 via the in-vehicle interface 13.

Specifically, the blind spot identification unit 21 acquires, as the position information, a positioning signal received by the GPS receiver which is the in-vehicle device 41 connected via the in-vehicle interface 13. Moreover, the blind spot identification unit 21 acquires, as the direction information, a signal obtained from the gyro sensor which is the in-vehicle device 41 connected via the in-vehicle interface 13.

In step S12, the blind spot identification unit 21 identifies one or more obstacles around the vehicle 100 from the position information and the direction information acquired in step S11 and the obstacle data 32 stored in the storage 122.

Specifically, the blind spot identification unit 21 reads the obstacle data 32 indicating the obstacle around the position indicated by the position information from the storage 122, thereby identifying the one or more obstacles around the vehicle 100. Around the vehicle corresponds to a range in which there is a possibility of the occurrence of a traffic accident between the vehicle 100 and an object popping out from the blind spot. The first embodiment assumes that around the vehicle corresponds to a range in front of the vehicle 100 in the direction of travel thereof indicated by the direction information within a radius of a reference distance. The reference distance may be a predetermined fixed value or may be determined by information such as the speed of the vehicle 100 or the speed limit of a road on which the vehicle 100 travels.

In step S13, the blind spot identification unit 21 selects an obstacle not yet selected as a target object from among the one or more obstacles identified in step S12.

In step S14, the blind spot identification unit 21 identifies a blind spot area caused by the target object selected in step S13.

Figure 4:
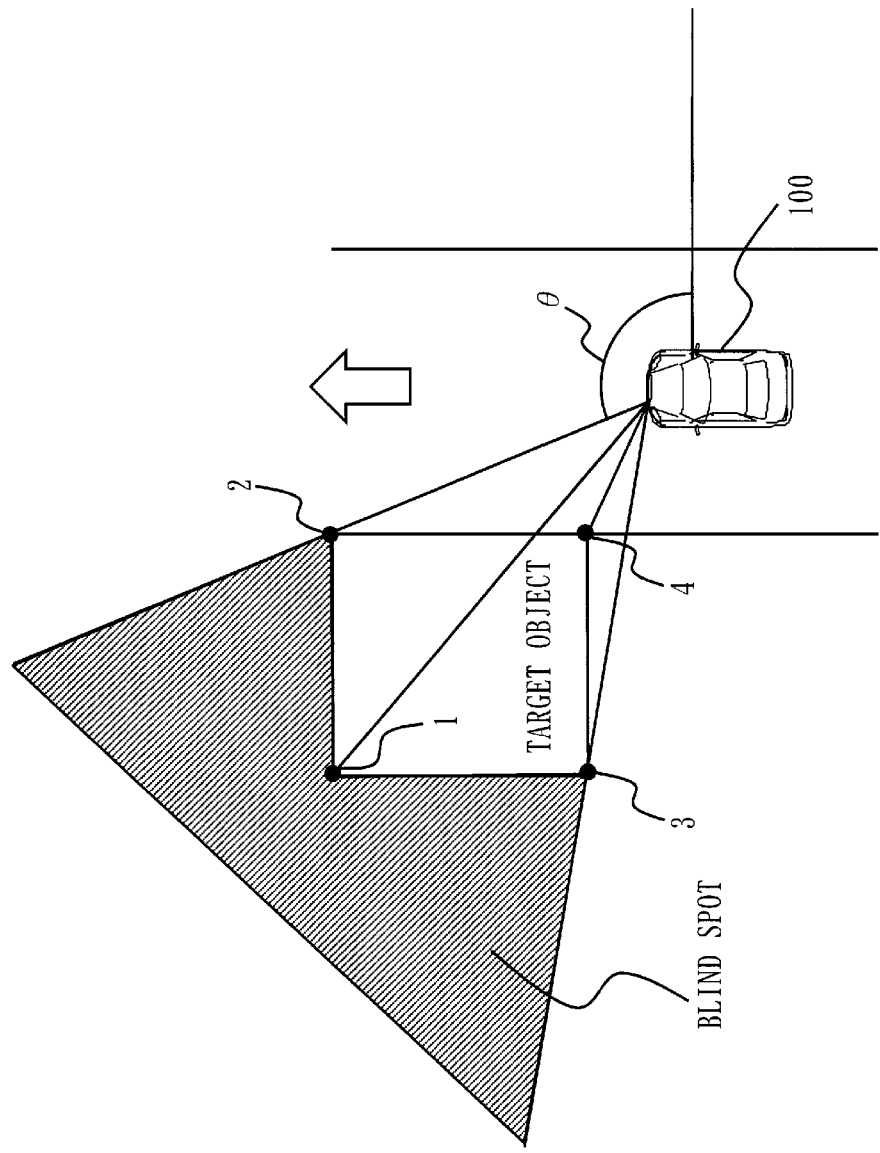
FIG. 4 is an illustrative diagram of processing that identifies a blind spot area according to the first embodiment.

A specific description will be made with reference to FIG. 4. The blind spot identification unit 21 determines whether or not each vertex of the occupied area of the target object indicated by the obstacle data 32 can be seen from the vehicle 100. Then, from among line segments connecting the respective vertices seen from the vehicle 100 and the position of the vehicle 100, the blind spot identification unit 21 identifies a line segment forming the largest angle θ with the right hand direction of the direction of travel of the vehicle and a line segment forming the smallest angle θ therewith. Note that the angle θ in this case is the angle formed by the line segment and the right hand direction of the direction of travel of the vehicle, but may be an angle formed by the line segment and the left hand direction of the direction of travel of the vehicle. The blind spot identification unit 21 identifies the two identified line segments as a boundary between the blind spot area and an area outside the blind spot. In FIG. 4, vertices 2 and 3 are identified as boundary points. The blind spot identification unit 21 writes, in the memory 121, each of the two vertices to which the two identified line segments are connected as the boundary point.

Figure 5:
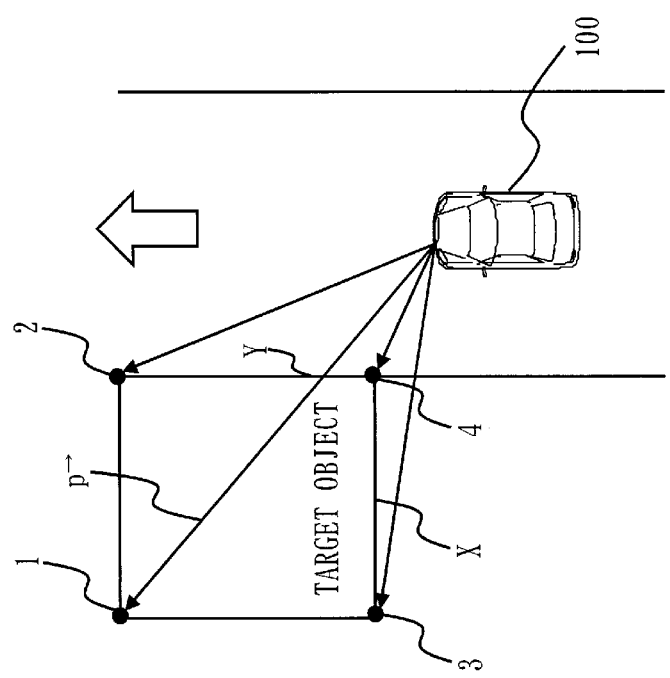
FIG. 5 is an illustrative diagram of vertexes visible from a vehicle 100 according to the first embodiment.

As for vertices 2, 3, and 4 visible from the vehicle 100, the line segments connecting the vehicle 100 and the vertices do not intersect with a side of the target object, as illustrated in FIG. 5. On the other hand, as for vertex 1 invisible from the vehicle 100, the line segment connecting the vehicle 100 and the vertex intersects with a side of the target object as illustrated in FIG. 5. Accordingly, the blind spot identification unit 21 determines whether or not a vertex can be seen from the vehicle 100 by whether or not a vector connecting the vehicle 100 and the vertex intersects with any side of the target object.

The blind spot identification unit 21 decomposes a vector $\vec{p}$ connecting the vehicle 100 and vertex v as $\vec{p}=t\vec{a_i}+s\vec{a_j}$. Here, the vectors $\vec{a_i}$ and $\vec{a_j}$ are vectors connecting the vehicle 100 and vertices at both ends of a target object side not connected to vertex v. In the case of FIG. 5 where the vector $\vec{p}$ is a vector connecting the vehicle 100 and vertex 1, sides X and Y are the sides not connected to vertex 1. Therefore, the vectors $\vec{a_i}$ and $\vec{a_j}$ are a vector connecting the vehicle 100 and vertex 3 and a vector connecting the vehicle 100 and vertex 4 when side X is selected as the target side, or a vector connecting the vehicle 100 and vertex 4 and a vector connecting the vehicle 100 and vertex 2 when side Y is selected as the target side. Note that the vector $\vec{p}$ connecting the vehicle 100 and vertex v does not intersect with the side connected to vertex v, so that the side connected to vertex v need not be the target side.

Then when $t\geq 0 \wedge s\geq 0 \wedge t+s\geq 1$, the blind spot identification unit 21 determines that the vector $\vec{p}$ intersects with the target side.

In step S15, the coordinate transformation unit 22 selects, as the position of the target object, at least one of the two boundary points connected to the vehicle 100 by the two line segments identified in step S14.

Specifically, the coordinate transformation unit 22 reads the two boundary points identified in step S14 from the memory 121. Then, in the first embodiment, the coordinate transformation unit 22 selects a vertex closer to the target position between the two boundary points as the position of the target object.

In step S16, the coordinate transformation unit 22 transforms the mean position of occurrence of a traffic accident relative to the position of the target object indicated by the probability parameter 31 into a position relative to the position of the target object selected in step S15. The coordinate transformation unit 22 further transforms the transformed mean position into coordinates in the coordinate system with its origin at the position of the vehicle 100. The coordinate transformation unit 22 writes the coordinates of the transformed mean position in the memory 121.

In step S17, the blind spot identification unit 21 determines whether or not there is an obstacle not selected in step S13.

The blind spot identification unit 21 returns the processing to step S13 if there is an unselected obstacle, or ends the processing if there is no unselected obstacle.

Figure 6:
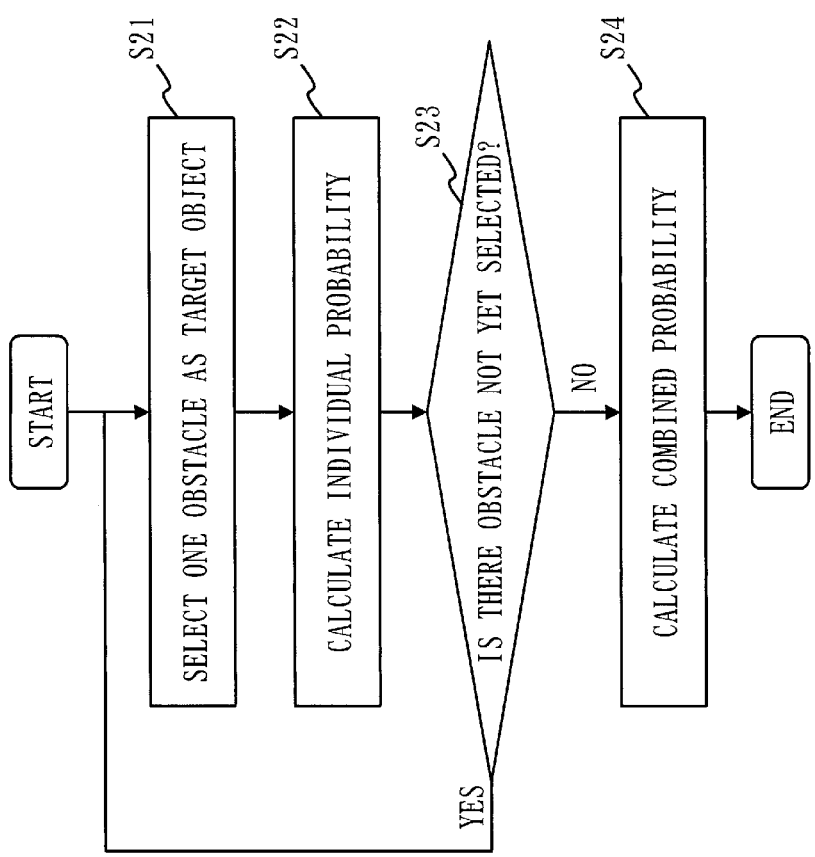
FIG. 6 is a flowchart of probability calculation processing according to the first embodiment.

The probability calculation processing according to the first embodiment will be described with reference to FIG. 6.

The probability calculation processing is executed after completion of the parameter transformation processing.

In step S21, the individual calculation part 231 selects an obstacle not yet selected as the target object from among the one or more obstacles identified in step S12.

In step S22, for the target object selected in step S21, the individual calculation part 231 calculates, as an individual probability, a probability of occurrence of a traffic accident at the target position with respect to the position of the target object from the coordinates of the mean position transformed in step S16 and the standard deviation indicated by the probability parameter 31.

Specifically, the individual calculation part 231 reads, from the memory 121, the coordinates of the mean position represented in the coordinate system with its origin at the position of the vehicle 100 and the standard deviation indicated by the probability parameter. Then, in the first embodiment, the individual calculation part 231 calculates an individual probability $P_i(p_x, p_y)$ at the target position by expression 1 using coordinates $(ox_i, oy_i)$ of the mean position, a standard deviation $(\sigma x_i, \sigma y_i)$, and coordinates $(p_x, p_y)$ of the target position on the assumption that the probability of occurrence of a traffic accident follows a normal distribution. Here, a variable "i" is a number assigned to the obstacle selected as the target object in step S21.

$$P_i(p_x, p_y) = \frac{1}{2\pi\sigma x_i \sigma y_i}\exp\left(-\frac{1}{2}\left(\left(\frac{p_x-ox_i}{\sigma x_i}\right)^2 + \left(\frac{p_y-oy_i}{\sigma y_i}\right)^2\right)\right)$$ [Expression 1]

The individual calculation part 231 writes the calculated individual probability into the memory 121.

In step S23, the individual calculation part 231 determines whether or not there is an obstacle not selected in step S21.

The individual calculation part 231 returns the processing to step S21 if there is an unselected obstacle, or advances the processing to step S24 if there is no unselected obstacle.

In step S24, the combined calculation part 232 calculates, as a combined probability, a probability of occurrence of a traffic accident at the target position with respect to the one or more obstacles identified in step S12 from the individual probability calculated in step S22.

Specifically, the combined calculation part 232 reads, from the memory 121, the individual probability calculated in step S22 for each obstacle selected as the target object. The combined calculation part 232 then calculates a logical OR of the individual probabilities being read as the combined probability according to expression 2.

$$P(p_x, p_y) = 1 - \prod_i (1 - P_i(p_x, p_y))$$ [Expression 2]

Figure 7:
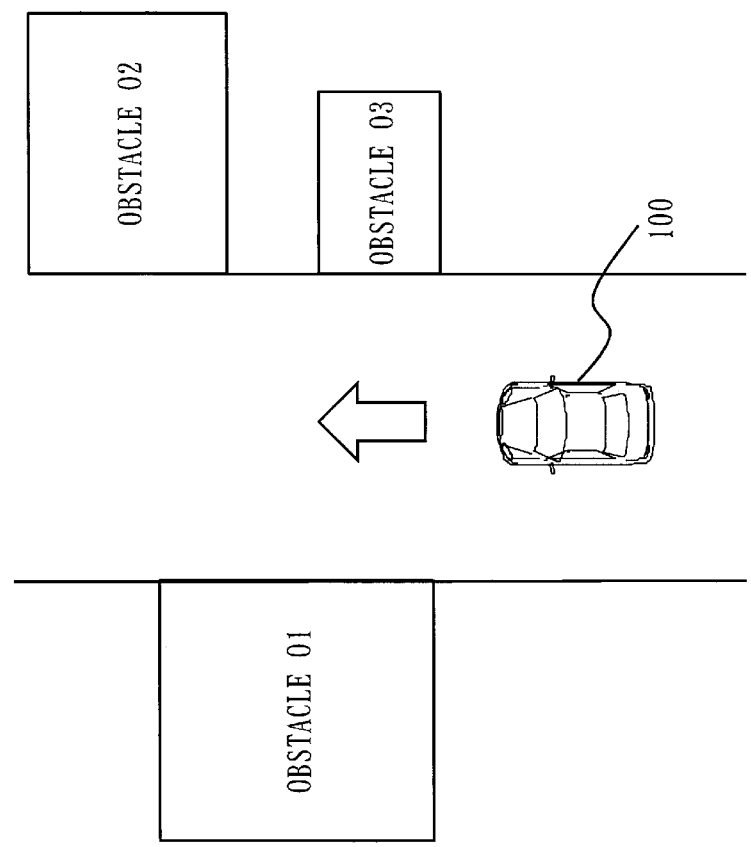
FIG. 7 is an illustrative diagram of the probability calculation processing according to the first embodiment.

That is, when a plurality of obstacles O1 to O3 is present around the vehicle 100 as illustrated in FIG. 7, the individual calculation part 231 first calculates the individual probabilities for the obstacles O1, O2, and O3. The combined calculation part 232 then calculates the probability of occurrence of a traffic accident at the target position in view of all the obstacles O1 to O3 by taking the logical OR of the individual probabilities for the respective obstacles O1, O2, and O3.

Note that in the above description, the coordinate transformation unit 22 in step S15 selects the boundary point closer to the target position as the position of the target object between the two boundary points. However, the coordinate transformation unit 22 may select both of the two boundary points as the position of the target object.

In this case, in step S16, the coordinate transformation unit 22 transforms the mean position into a position with respect to each of the positions of the two target objects, and transforms each of the two transformed mean positions into the coordinates in the coordinate system with its origin at the position of the vehicle 100. In step S22, the individual calculation part 231 calculates an individual probability $P_i^1(p_x, p_y)$ by expression 1 on the basis of the coordinates of one of the two mean positions, and calculates an individual probability $P_i^2(p_x, p_y)$ by expression 1 on the basis of the coordinates of the other mean position. The individual calculation part 231 then calculates a logical OR of the individual probability $P_i^1(p_x, p_y)$ and the individual probability $P_i^2(p_x, p_y)$ as the individual probability $P_i(p_x, p_y)$ by expression 3.

$$P_i(p_x, p_y) = P_i^1(p_x, p_y) + P_i^2(p_x, p_y) - P_i^1(p_x, p_y) \cdot P_i^2(p_x, p_y)$$ [Expression 3]

Effects of First Embodiment

As described above, the accident probability calculator 10 according to the first embodiment calculates the probability of occurrence of an accident at the target position in view of the one or more obstacles around the vehicle 100. As a result, the probability of occurrence of a traffic accident at each position around the blind spot can be calculated.

Figure 8:
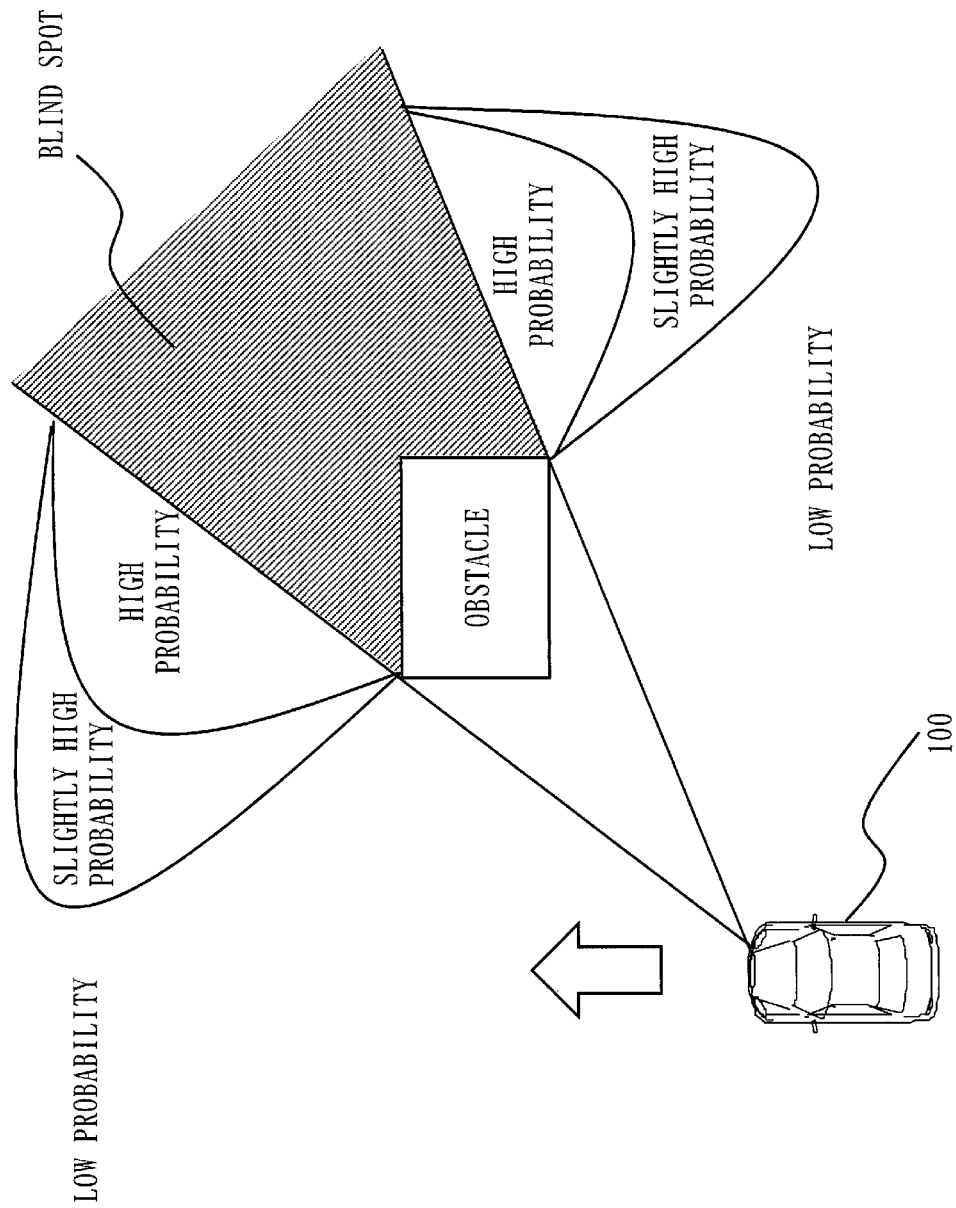
FIG. 8 is a diagram illustrating a distribution of a probability of occurrence of a traffic accident according to the first embodiment.

FIG. 8 illustrates an example of a distribution of the probability of occurrence of a traffic accident. In FIG. 8, the individual probability which is the probability of occurrence of a traffic accident for one obstacle is higher at a position closer to the blind spot and lower at a position farther away from the blind spot. The combined probability is calculated by integrating the individual probability and is thus high when a plurality of obstacles is placed close to one another.

Other Configurations
<First Variation>

In the first embodiment, the functions of the units included in the accident probability calculator 10 are implemented in software. However, as a first variation, the functions of the units included in the accident probability calculator 10 may be implemented in hardware. The first variation will be described focusing on the difference from the first embodiment.

Figure 9:
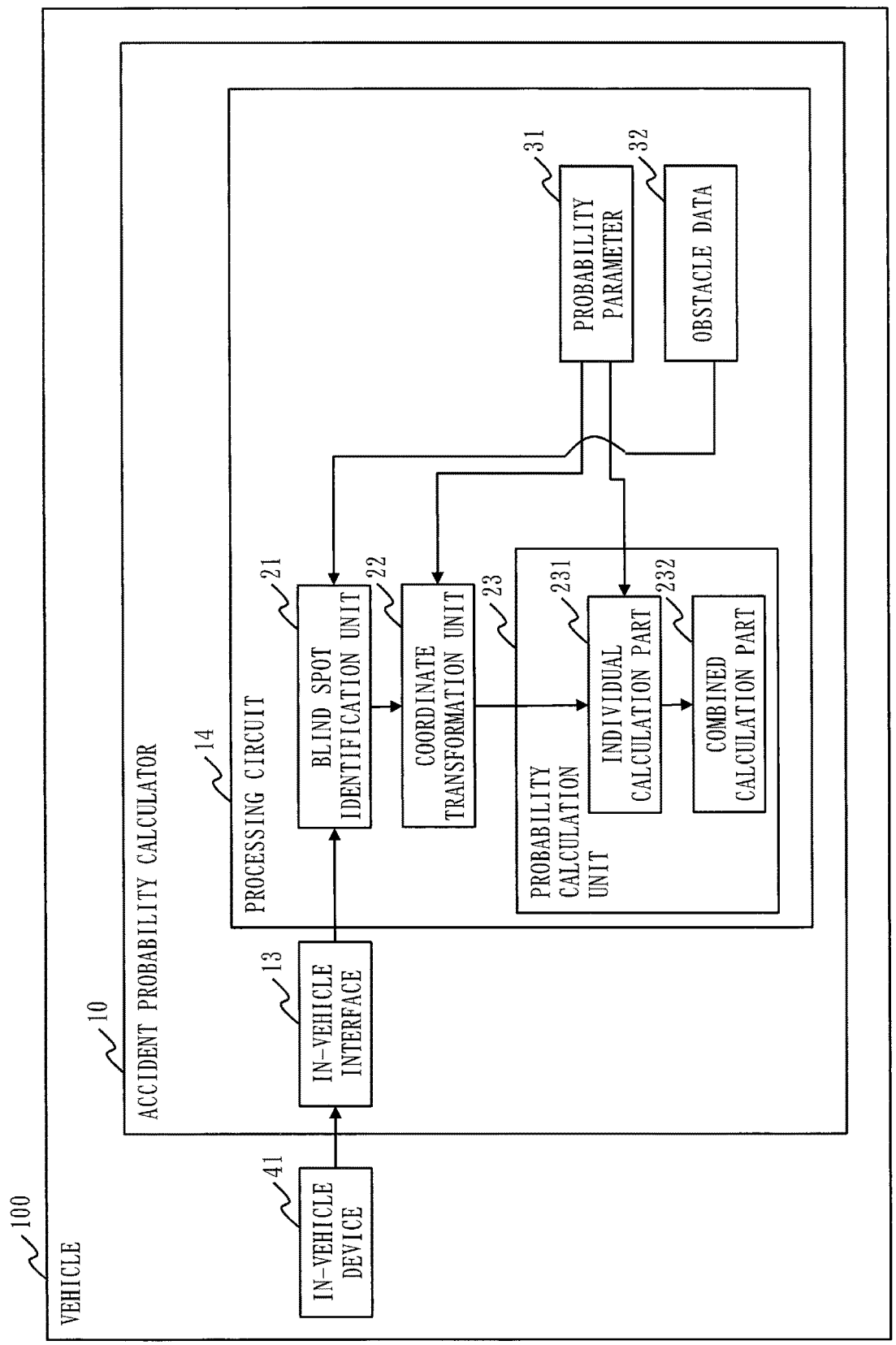
FIG. 9 is a block diagram of an accident probability calculator 10 according to a first variation.

The configuration of the accident probability calculator 10 according to the first variation will be described with reference to FIG. 9.

When the functions of the units are implemented in hardware, the accident probability calculator 10 includes a processing circuit 14 in place of the processor 11 and the storage device 12. The processing circuit 14 is a dedicated electronic circuit for implementing the functions of the units included in the accident probability calculator 10 and the function of the storage device 12.

The processing circuit 14 can be a single circuit, a composite circuit, a programmed processor, a parallel programmed processor, a logic IC, a gate array (GA), an application specific integrated circuit (ASIC), or a field-programmable gate array (FPGA).

The functions of the units may be implemented by one processing circuit 14 or may be distributed into a plurality of the processing circuits 14 to be implemented.

<Second Variation>

As a second variation, some functions may be implemented in hardware while other functions may be implemented in software. That is, some functions of the units included in the accident probability calculator 10 may be implemented in hardware while other functions may be implemented in software.

The processor 11, the storage device 12, and the processing circuit 14 are collectively referred to as "processing circuitry". That is, the functions of the units are implemented by the processing circuitry.

Second Embodiment

The first embodiment assumes that the probability of occurrence of a traffic accident follows the normal distribution. A second embodiment assumes that a probability of occurrence of a traffic accident follows a probability distribution based on a kinetic model of an object popping out being the other party of a traffic accident. This difference will be described in the second embodiment.

Description of Configuration

The configuration of an accident probability calculator 10 is the same as the configuration of the accident probability calculator 10 according to the first embodiment illustrated in FIG. 1.

Description of Operation

Figure 10:
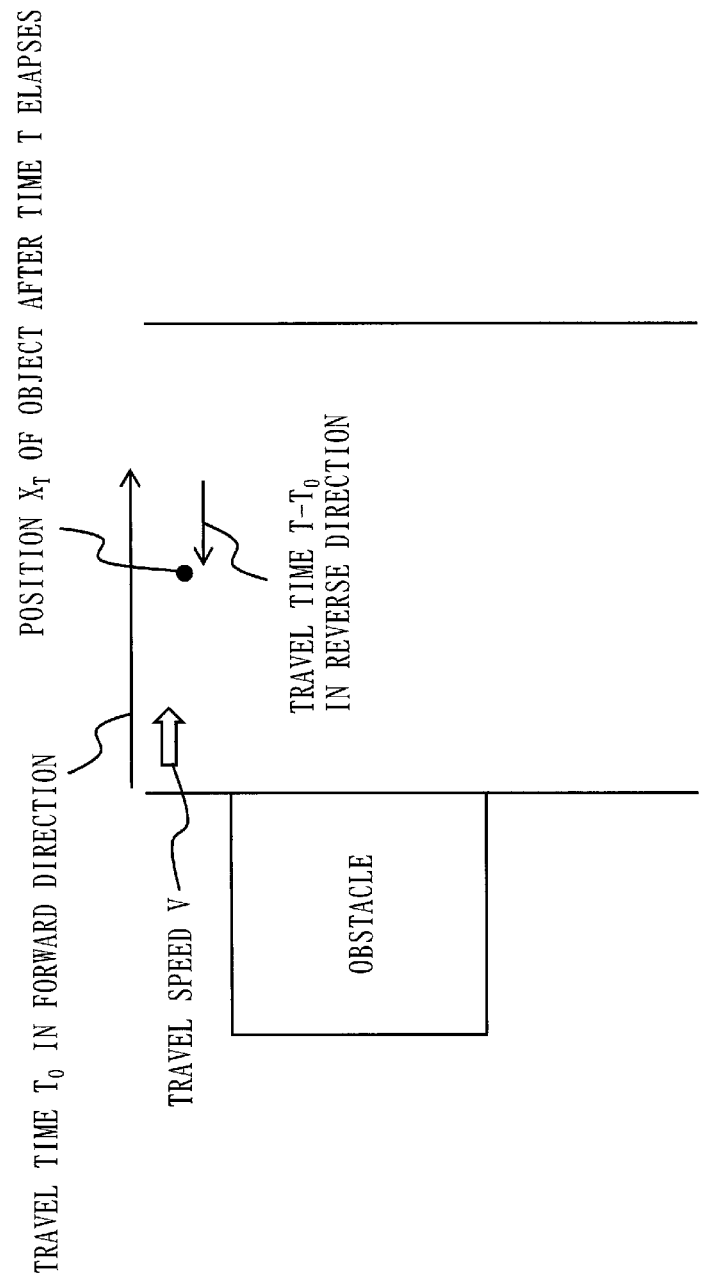
FIG. 10 is an illustrative diagram of processing in the case of using a random walk model according to a second embodiment.

The operation of the accident probability calculator 10 according to the second embodiment will be described with reference to FIGS. 6 and 10.

The operation of the accident probability calculator 10 according to the second embodiment corresponds to an accident probability calculation method according to the second embodiment. The operation of the accident probability calculator 10 according to the second embodiment further corresponds to processing of an accident probability calculation program according to the second embodiment.

Probability calculation processing according to the second embodiment will be described with reference to FIG. 6. Steps S21 and S23 to S24 are the same as those in the first embodiment.

In step S22, an individual calculation part 231 assumes that a probability of occurrence follows a probability distribution based on a kinetic model of an object popping out.

A specific description will be made with reference to FIG. 10. In the second embodiment, the individual calculation part 231 defines the probability distribution using a random walk model in a direction perpendicular to a road on which a vehicle 100 travels. That is, the individual calculation part 231 uses a kinetic model assuming that the object popping out takes the shortest distance to cross the road.

In this case, the probability of occurrence depends on the amount of travel of the object, and a time condition is required for calculating the probability of occurrence. Then, a probability of presence of the object at the time t seconds elapse is determined as the probability of occurrence.

The position in a one-dimensional random walk model in the direction perpendicular to the road is defined. Let position $X_T$ be the position after the lapse of time T from a starting point of travel t=0. At position $X_T$, let $T_0(0 \leq T_0 \leq T)$ be the time of travel in a forward direction which is a direction from the side of an obstacle to the opposite side of the road. Moreover, let speed V be the travel speed of the object which is constant. Then, $X_T = VT_0 - V(T-T_0) = 2VT_0 - VT$ holds.

With the random walk being adopted, time of travel $T_0$ in the forward direction is random. The second embodiment assumes that time $T_0$ follows a normal distribution. Then from the expression of $X_T$, the time can be expressed as $T_0 = X_T/2V - T/2$. This can determine time $T_0$ corresponding to position $X_T$ with respect to certain time T, and a probability of occurrence of time $T_0$ can be calculated from the normal distribution. Note that let position $X_T$ be a target position and time T be the time required for the vehicle 100 to reach the target position. The time required for the vehicle 100 to reach the target position can be calculated from the distance between the vehicle 100 and the target position and the speed of the vehicle 100. Moreover, speed V is assumed to be predetermined.

Then, the individual calculation part 231 calculates an individual probability $P_i(p_x, p_y)$ at the target position by expression 4 using coordinates $(ox_i, oy_i)$ of a mean position, a standard deviation $(\sigma x_i, \sigma y_i)$, and coordinates $(p_x, p_y)$ of the target position.

$$P_i(p_x, p_y) = \frac{1}{\sqrt{2\pi}\sigma x_i} \exp\left(-\frac{(T_0 - ox_i)^2}{2\sigma x_i^2}\right) \quad \text{[Expression 4]}$$

In the above description, one kinetic model is defined for the object popping out. However, as a third variation, a kinetic model may be defined for each type of object popping out such as a pedestrian, a vehicle, and a bicycle. An individual probability may then be calculated for each type of the object to calculate a combined probability by calculating a logical OR of the individual probability calculated for each type. At this time, speed V may be determined for each type of the object assumed to be popping out.

Effects of Second Embodiment

As described above, the accident probability calculator 10 according to the second embodiment calculates the individual probability on the assumption that the probability of occurrence of a traffic accident follows the probability distribution based on the kinetic model of the object popping out. As a result, a more appropriate probability of occurrence of a traffic accident can be calculated.

Third Embodiment

In the first embodiment, the probability parameter 31 is stored in advance in the storage 122. A third embodiment is different from the first embodiment in that a probability parameter 31 is calculated. This difference will be described in the third embodiment.

Note that the third embodiment will describe a case where a function is added to the first embodiment. However, a function can be added to the second embodiment as well.

Description of Configuration

The configuration of an accident probability calculator 10 according to the third embodiment will be described with reference to FIG. 11.

The accident probability calculator 10 includes a parameter generation unit 24 that generates the probability parameter 31 from accident data 33 in addition to the functional configuration of the accident probability calculator 10 illustrated in FIG. 1. The function of the parameter generation unit 24 is implemented in software.

Description of Operation

Figure 12:
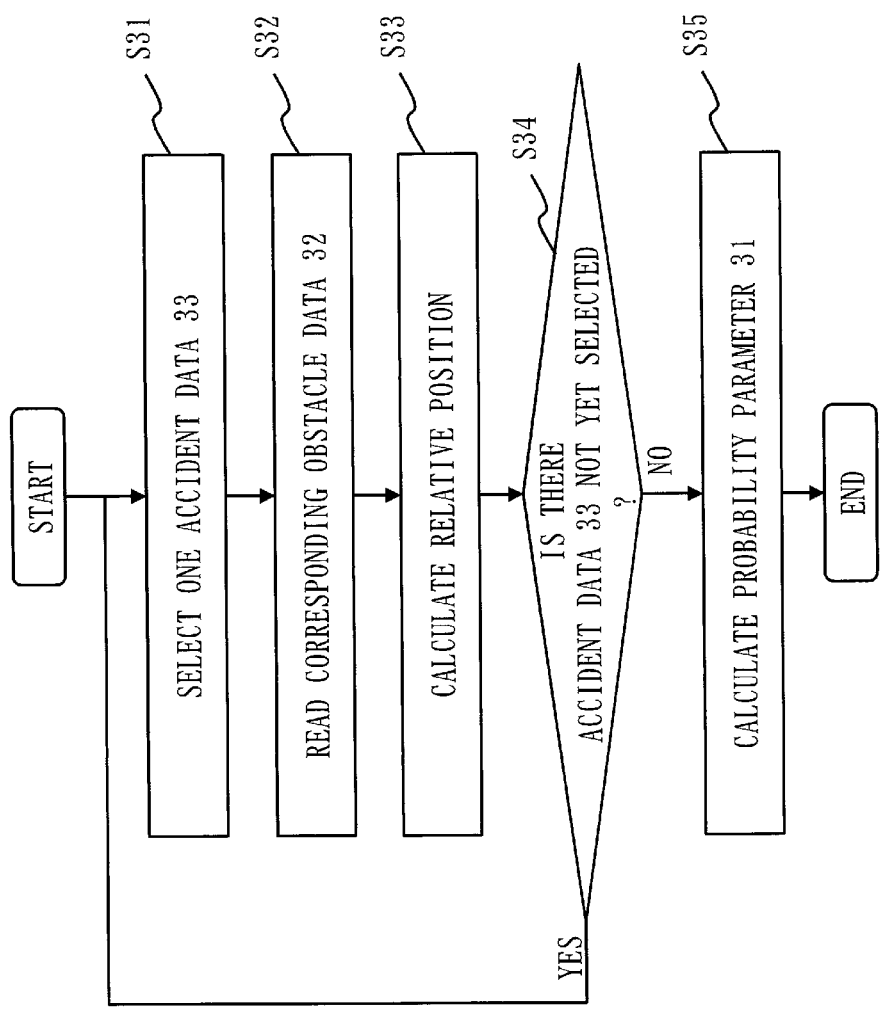
FIG. 12 is a flowchart of parameter generation processing according to the third embodiment.

The operation of the accident probability calculator 10 according to the third embodiment will be described with reference to FIGS. 12 to 13.

The operation of the accident probability calculator 10 according to the third embodiment corresponds to an accident probability calculation method according to the third embodiment. The operation of the accident probability calculator 10 according to the third embodiment further corresponds to processing of an accident probability calculation program according to the third embodiment.

The operation of the accident probability calculator 10 according to the third embodiment includes parameter generation processing in addition to the operation of the accident probability calculator 10 according to the first embodiment.

The parameter generation processing according to the third embodiment will be described with reference to FIG. 12.

The parameter generation processing assumes that the accident data 33 is stored in a storage 122. The accident data 33 indicates a two-dimensional position excluding a height of a site of occurrence of a traffic accident caused by an object popping out from a blind spot, and the direction of travel of a vehicle involved in the accident. The accident data 33 is data obtained by digitizing an accident record prepared at the time of occurrence of the traffic accident, where the coordinate system of the accident data is an absolute coordinate system such as a plane rectangular coordinate system indicating an absolute position.

In step S31, the parameter generation unit 24 selects and reads accident data 33 that is not yet selected from the accident data 33 stored in the storage 122.

In step S32, the parameter generation unit 24 reads obstacle data 32 of an obstacle corresponding to the accident data 33 selected in step S31 from the obstacle data 32 stored in the storage 122.

The obstacle corresponding to the accident data 33 is an obstacle closest to the position indicated by the accident data 33 in the third embodiment. Note that when the accident data 33 indicates the position at which the object involved in the traffic accident pops out, the obstacle corresponding to the accident data 33 is an obstacle forming a blind spot at the position at which the object pops out.

In step S33, the parameter generation unit 24 transforms the accident data 33 selected in step S31 into data indicating the position of occurrence of the traffic accident in a relative coordinate system based on the position of the obstacle indicated by the obstacle data 32 read in step S32. That is, the parameter generation unit 24 calculates a relative position of the occurrence of the traffic accident with respect to the position of the obstacle from the position and the direction of travel of the vehicle indicated by the accident data 33 selected in step S31 and the position of the obstacle indicated by the obstacle data 32 read in step S32.

Figure 13:
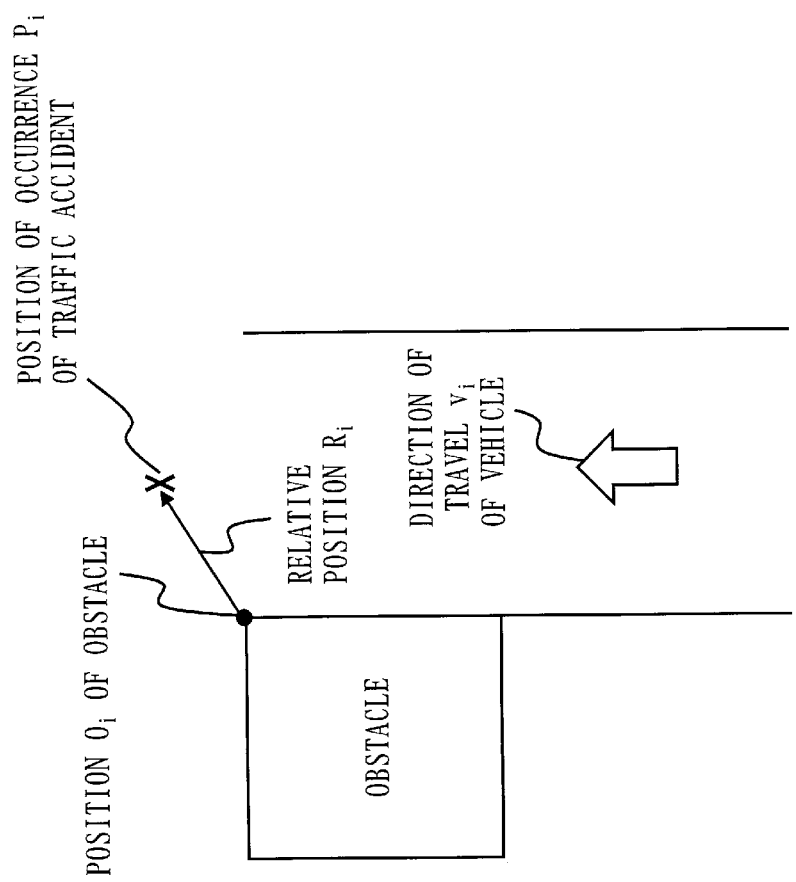
FIG. 13 is an illustrative diagram of processing that calculates a relative position according to the third embodiment.

Specifically, as illustrated in FIG. 13, the parameter generation unit 24 calculates a relative position $R_i=(rx_i, ry_i)$ by expression 5 using a position $P_i=(px_i, py_i)$ and a direction of travel of the vehicle $v_i=(vx_i, vy_i)$ indicated by the accident data 33 as well as a position of the obstacle $O_i=(ox_i, oy_i)$. Note that the position of the obstacle is the position of a vertex of the obstacle closest to the position indicated by the accident data 33. Moreover, a variable "i" is a number assigned to the accident data 33 selected in step S31.

$$\begin{pmatrix} rx_i \\ ry_i \end{pmatrix} = \begin{pmatrix} \cos\theta & -\sin\theta \\ \sin\theta & \cos\theta \end{pmatrix} \begin{pmatrix} px_i - ox_i \\ py_i - oy_i \end{pmatrix} \quad \text{[Expression 5]}$$

Note that θ is as follows.

$$\theta = \begin{cases} \theta_0 (vy_i \geq 0) \\ \frac{\pi}{2} - \theta_0 (vy_i < 0, vx_i \geq 0) \\ -\frac{\pi}{2} - \theta_0 (vy_i < 0, vx_i < 0) \end{cases}$$

where $\theta_0 = \arccos\left(vy_i / \sqrt{vx_i^2 + vy_i^2}\right)$

In step S34, the parameter generation unit 24 determines whether or not there is accident data 33 not selected in step S31.

The parameter generation unit 24 returns the processing to step S31 if there is unselected accident data 33, or advances the processing to step S35 if there is no unselected accident data 33.

In step S35, the parameter generation unit 24 calculates a mean of the relative position calculated in step S33 as a mean position and calculates a standard deviation of the relative position. The parameter generation unit 24 then writes the probability parameter 31 indicating the calculated mean position and standard deviation in the storage 122.

Effects of Third Embodiment

As described above, the accident probability calculator 10 according to the third embodiment generates the probability parameter 31 by transforming the coordinates of the position of occurrence of the past traffic accident into the relative position based on the position of the obstacle. As a result, the information on a past traffic accident caused by an object popping out from a blind spot can be used to calculate a probability of occurrence of a traffic accident caused by an object popping out from a blind spot of an obstacle at another site.

Fourth Embodiment

In the third embodiment, the accident data 33 is stored in the storage 122. A fourth embodiment is different from the third embodiment in that accident data 33 is externally acquired and updated.

Description of Configuration

Figure 14:
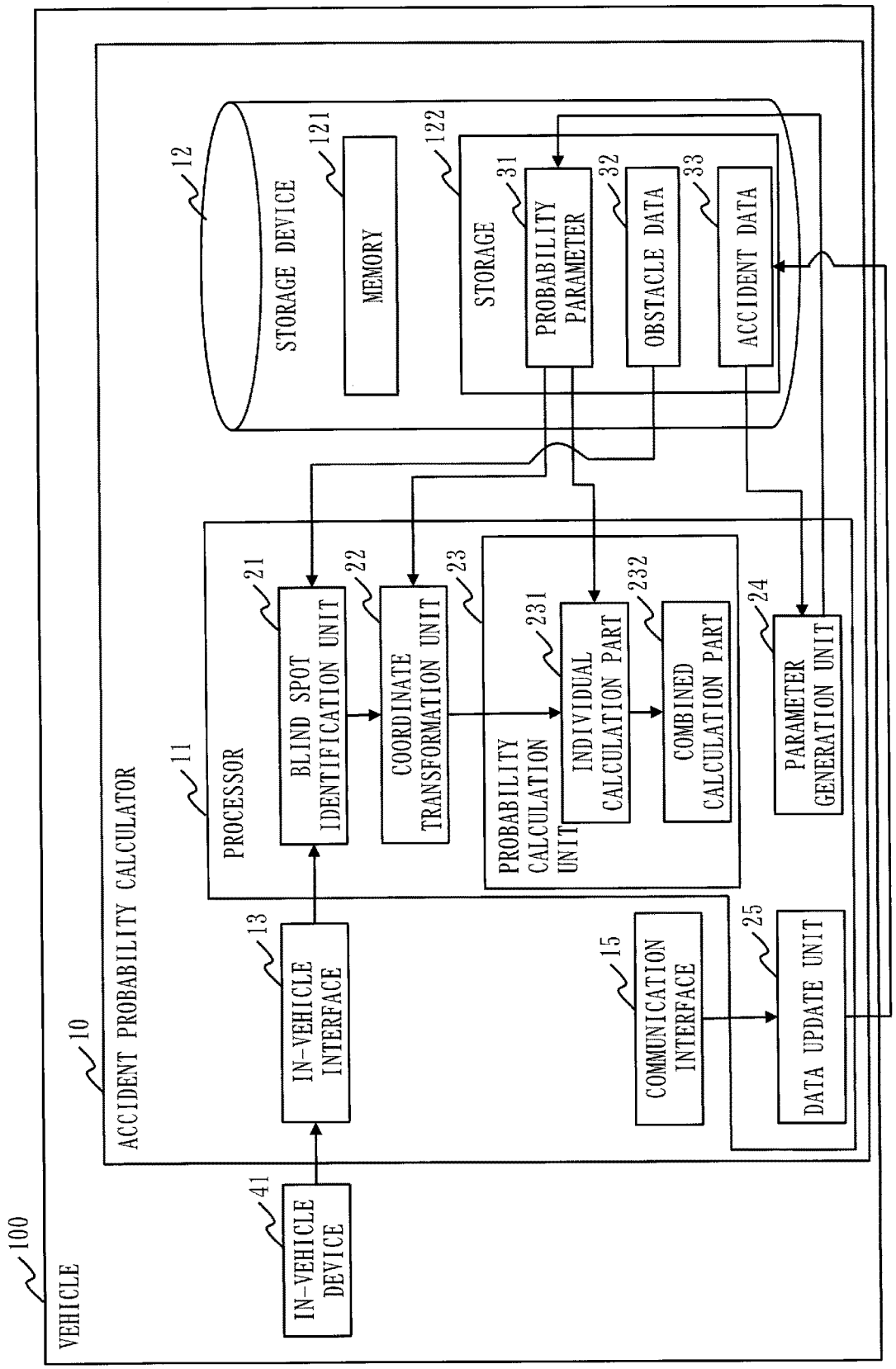
FIG. 14 is a block diagram of an accident probability calculator 10 according to a fourth embodiment.

The configuration of an accident probability calculator 10 according to the fourth embodiment will be described with reference to FIG. 14.

Figure 11:
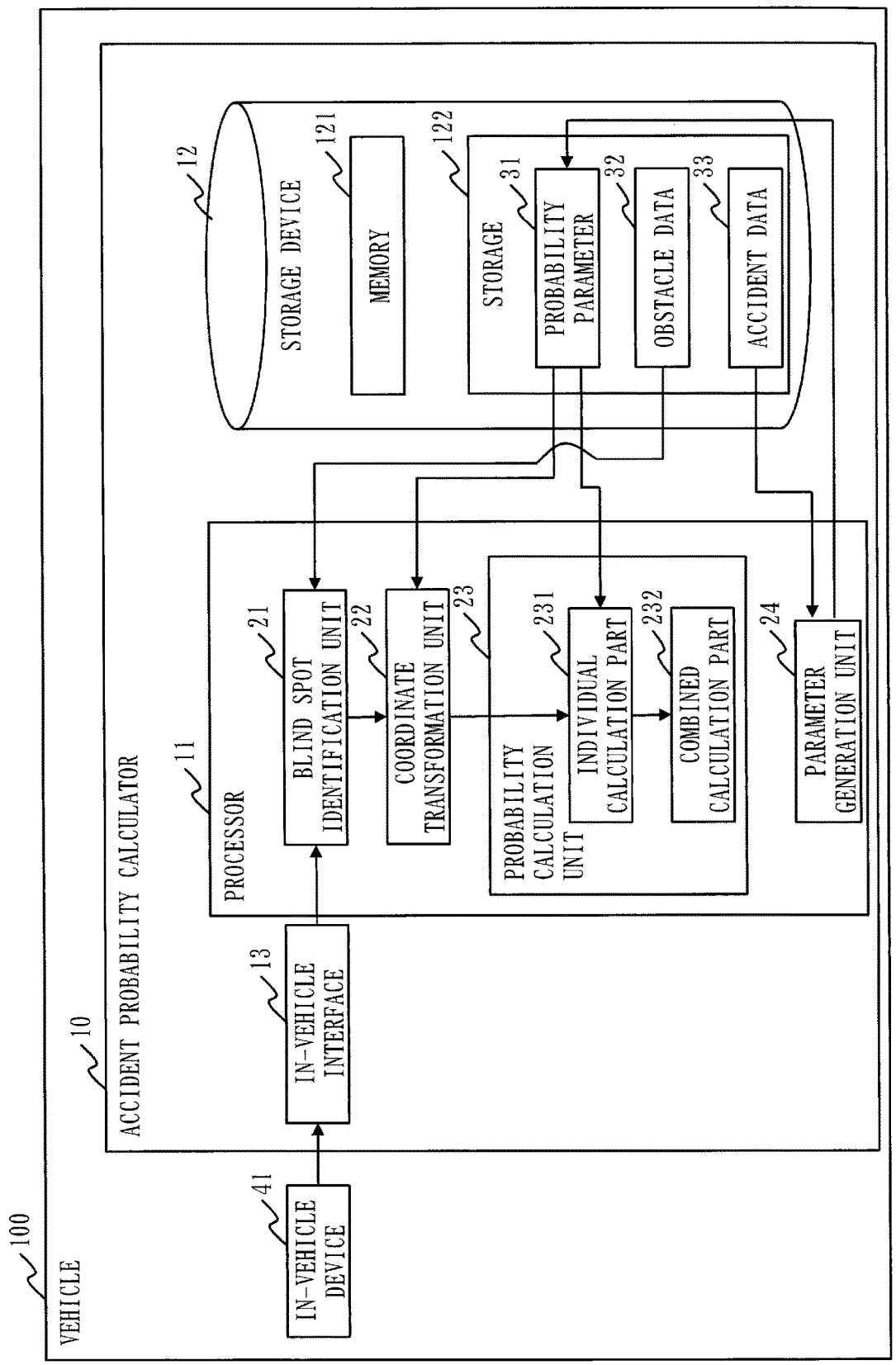
FIG. 11 is a block diagram of an accident probability calculator 10 according to a third embodiment.

The accident probability calculator 10 includes a communication interface 15 in addition to the configuration of the accident probability calculator 10 illustrated in FIG. 11. The communication interface 15 is an interface for communicating with an external device such as an external server. The communication interface 15 is specifically a communication chip or a network interface card (NIC).

The accident probability calculator 10 includes a data update unit 25 that acquires the accident data 33 from an external device in addition to the functional components of the accident probability calculator 10 illustrated in FIG. 11. The function of the data update unit 25 is implemented in software.

Description of Operation

Figure 15:
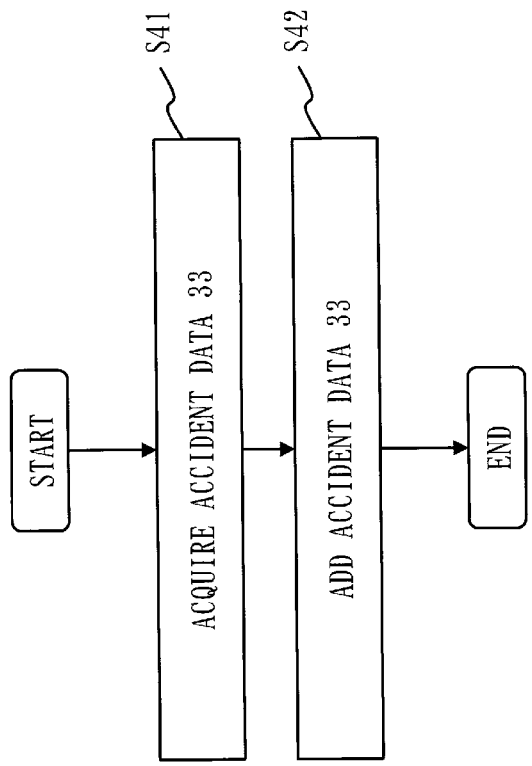
FIG. 15 is a flowchart of data update processing according to the fourth embodiment.

The operation of the accident probability calculator 10 according to the fourth embodiment will be described with reference to FIG. 15.

The operation of the accident probability calculator 10 according to the fourth embodiment corresponds to an accident probability calculation method according to the fourth embodiment. The operation of the accident probability calculator 10 according to the fourth embodiment further corresponds to processing of an accident probability calculation program according to the fourth embodiment.

The operation of the accident probability calculator 10 according to the fourth embodiment includes data update processing in addition to the operation of the accident probability calculator 10 according to the third embodiment.

The data update processing according to the fourth embodiment will be described with reference to FIG. 15.

In step S41, the data update unit 25 acquires the accident data 33 from the external device such as the external server via the communication interface 15. The external device registers new accident data 33 successively as an accident record is digitized.

In step S42, the data update unit 25 writes the accident data 33 acquired in step S41 into a storage 122. The accident data 33 is thus added in the storage 122.

A parameter generation unit 24 executes parameter generation processing on a regular basis or every time the accident data 33 is acquired by a reference amount. As a result, a probability parameter 31 in view of the new accident data 33 is generated.

Effects of Fourth Embodiment

As described above, the accident probability calculator 10 according to the fourth embodiment adds the accident data 33 in the storage 122. This makes the probability parameter 31 appropriate to allow for calculation of a more appropriate probability of occurrence of a traffic accident.

Fifth Embodiment

The first to fourth embodiments describe the method of calculating the probability of occurrence of a traffic accident. A fifth embodiment is different from the first to fourth embodiments in that a vehicle 100 is controlled on the basis of the probability of occurrence of a traffic accident calculated by the method described in the first to fourth embodiments. This difference will be described in the fifth embodiment.

Note that the fifth embodiment will describe a case where a function is added to the first embodiment. However, a function can be added to the second to fourth embodiments as well.

Description of Configuration

Figure 16:
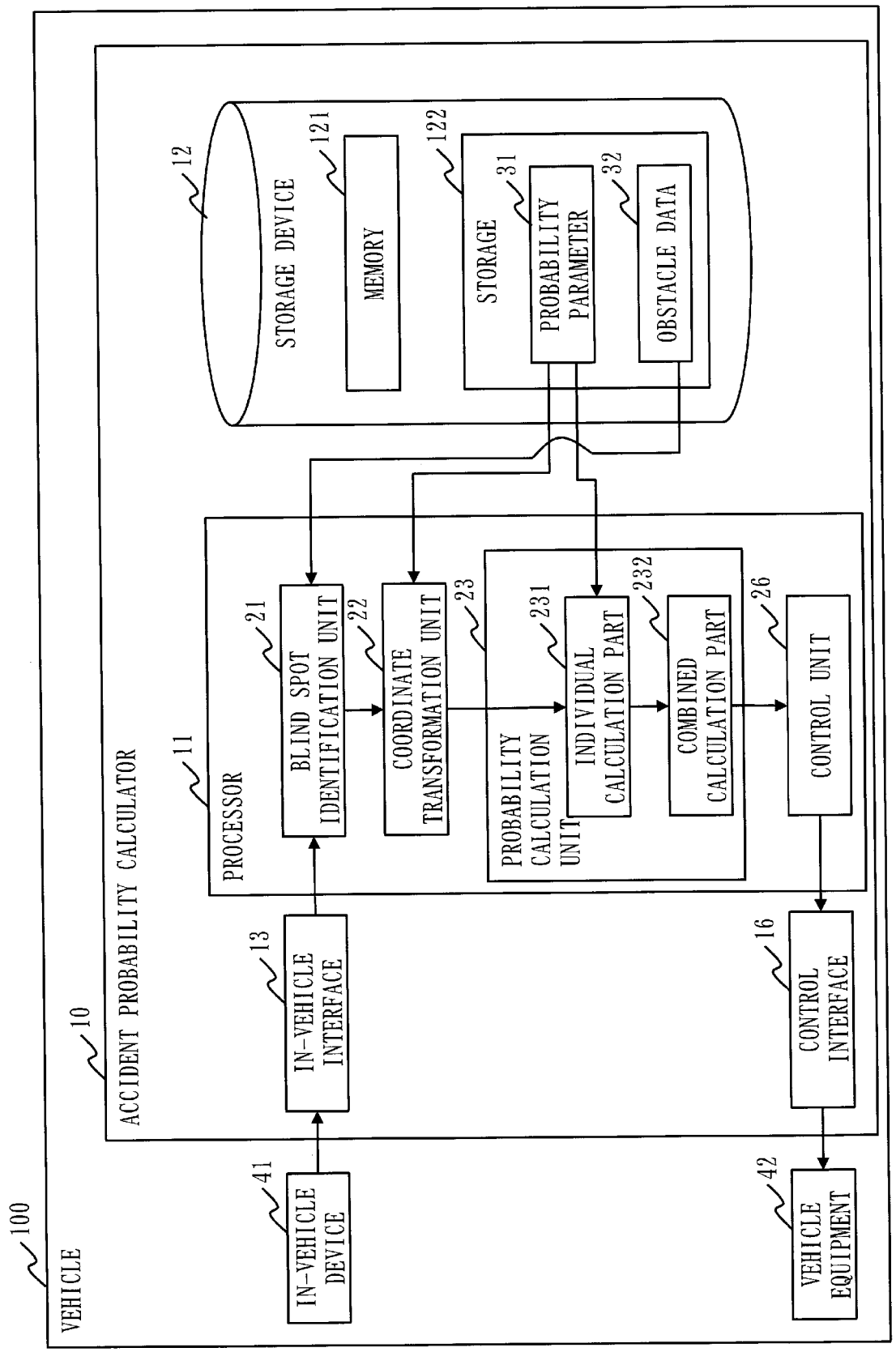
FIG. 16 is a block diagram of an accident probability calculator 10 according to a fifth embodiment.

The configuration of an accident probability calculator 10 according to the fifth embodiment will be described with reference to FIG. 16.

The accident probability calculator 10 includes a control interface 16 in addition to the configuration of the accident probability calculator 10 illustrated in FIG. 1. The control interface 16 is a device for connecting vehicle equipment 42 such as an accelerator, a brake, a steering wheel, and a display. The control interface 16 is specifically a vehicle control electronic control unit (ECU).

The accident probability calculator 10 includes a control unit 26 in addition to the functional components of the accident probability calculator 10 illustrated in FIG. 1. The function of the control unit 26 is implemented in software.

Description of Operation

The operation of the accident probability calculator 10 according to the fifth embodiment will be described with reference to FIG. 17.

The operation of the accident probability calculator 10 according to the fifth embodiment corresponds to an accident probability calculation method according to the fifth embodiment. The operation of the accident probability calculator 10 according to the fifth embodiment further corresponds to processing of an accident probability calculation program according to the fifth embodiment.

The operation of the accident probability calculator 10 according to the fifth embodiment includes drive control processing in addition to the operation of the accident probability calculator 10 according to the first embodiment.

The drive control processing according to the fifth embodiment will be described with reference to FIG. 17.

The drive control processing assumes that a combined probability for many positions in front of the vehicle 100 is calculated by probability calculation processing. The fifth embodiment assumes that the combined probability is calculated at every reference interval between the direction of travel of the vehicle 100 and a direction perpendicular to the direction of travel for a lane along the direction of travel of the vehicle 100 up to a reference distance in front of the vehicle 100. The reference interval is determined in accordance with information such as a processing load.

In step S51, the control unit 26 identifies a position with the probability of occurrence of a traffic accident higher than a threshold on the basis of the combined probability for each position calculated in step S24.

In step S52, the control unit 26 controls the vehicle equipment 42 such as the brake or the steering wheel to avoid the position that is identified as having the probability of occurrence of an accident higher than the threshold in step S51. Alternatively, the control unit 26 controls the vehicle equipment 42 such as the brake or the accelerator to reduce the speed to such a degree that the vehicle can make a sudden stop before passing the position that is identified as having the probability of occurrence of an accident higher than the threshold in step S51. Yet alternatively, the control unit 26 controls the vehicle equipment 42 such as the display to display the position that is identified as having the probability of occurrence of an accident higher than the threshold in step S51. In addition, another means such as sound, light, or vibration may be used to alert a driver of the vehicle 100 to the position with the probability of occurrence of an accident higher than the threshold.

Effects of Fifth Embodiment

As described above, the accident probability calculator 10 according to the fifth embodiment controls the vehicle 100 on the basis of the combined probability. This can prevent a traffic accident even when an object pops out of a blind spot.

REFERENCE SIGNS LIST

10: accident probability calculator, 11: processor, 12: storage device, 121: memory, 122: storage, 13: in-vehicle interface, 14: processing circuit, 15: communication interface, 16: control interface, 21: blind spot identification unit, 22: coordinate transformation unit, 23: probability calculation unit, 231: individual calculation part, 232: combined calculation part, 24: parameter generation unit, 25: data update unit, 26: control unit, 31: probability parameter, 32: obstacle data, 33: accident data, 41: in-vehicle device, 42: vehicle equipment, 100: vehicle.

The invention claimed is:

1. An accident probability calculator comprising at least one processing comprising:
   a blind spot identification unit to identify an obstacle around a vehicle; and
   an individual calculation part to calculate, as an individual probability, a probability of occurrence of a traffic accident at a target position with respect to a position of a target object which is the obstacle identified by the blind spot identification unit, based on a kinetic model assuming that the target object moves in a shortest path.

2. The accident probability calculator according to claim 1, wherein
   the individual calculation part uses a probability parameter to calculate the individual probability on the assumption that the probability of occurrence of a traffic accident follows a probability distribution based on a kinetic model of an object which is the other party in the traffic accident, the probability parameter indicating a mean and a variation of a relative position of occurrence of a traffic accident in the past with respect to a position of the obstacle.

3. The accident probability calculator according to claim 2, wherein
   the individual calculation part adopts a random walk model in a direction perpendicular to a direction of a road on which the vehicle travels in a two-dimensional plane as the kinetic model of the object being the other party in the traffic accident, and calculates the individual probability on the assumption that an amount of travel in one direction in the random walk model follows a normal distribution.

4. The accident probability calculator according to claim 1, further comprising
   a parameter generation unit to generate a probability parameter by transforming accident data, which indicates a position of occurrence of a traffic accident in the past in an absolute coordinate system, into data indicating the position of occurrence in a relative coordinate system based on the position of the obstacle.

5. The accident probability calculator according to claim 4, further comprising a data update unit to acquire the accident data from an external device, wherein
   the parameter generation unit calculates the probability parameter on a regular basis or every time the accident data is acquired by a reference amount.

6. The accident probability calculator according to claim 1, further comprising
   a control unit to control vehicle equipment mounted in the vehicle on the basis of the probability of occurrence of a traffic accident being calculated.

7. The accident probability calculator according to claim 6, further comprising a combined calculation part that calculates a logical OR of the individual probability as a combined probability.

8. An accident probability calculation method comprising:
   identifying an obstacle around a vehicle; and
   calculating a probability of occurrence of a traffic accident at a target position with respect to a position of a target object which is the obstacle being identified, based on a kinetic model assuming that the target object moves in a shortest path.

9. A non-transitory computer readable medium storing an accident probability calculation program that causes a computer to execute the accident probability calculation method of claim 8.

* * * * *